United States Patent [19]

Cooke

[11] 4,032,086

[45] June 28, 1977

[54] AEROSTATS AND AQUASTATS

[76] Inventor: William Douglas Cooke, The Rowans, Love Lane, Iver, Buckinghamshire, England

[22] Filed: Oct. 20, 1975

[21] Appl. No.: 624,045

[52] U.S. Cl. .................................. 244/30; 244/31; 244/97; 244/125

[51] Int. Cl.² ...................... B64B 1/58; B64B 1/40

[58] Field of Search ................. 244/31, 30, 24, 97, 244/125; 74/521; 114/16 E, 54

[56] References Cited

UNITED STATES PATENTS

| 205,319 | 6/1878 | Tracy | 244/125 |
|---|---|---|---|
| 998,538 | 7/1911 | Lehmann | 244/97 |

FOREIGN PATENTS OR APPLICATIONS

| 4,016 | 6/1907 | United Kingdom | 244/31 |

Primary Examiner—George E. A. Halvosa
Assistant Examiner—Barry L. Kelmachter
Attorney, Agent, or Firm—Larson, Taylor and Hinds

[57] ABSTRACT

Aerostats and aquastats are described in which a sealed envelope of flexible material impervious to the passage of gas therethrough is mounted on a flexible frame forming a permanent part of the device and which can be caused to expand the envelope after it has been wholly or very substantially evacuated of internal gas, thereby setting up a vacuum or partial vacuum condition in the envelope. In the case of a partial vacuum, the gas at reduced pressure may be hydrogen or helium. The lift or buoyancy of the device may be controlled when in use by altering the volume of the envelope by adjusting the shape of the frame by acting mechanism carried by the device. The frame may comprise flexible rods connected together at opposite ends so that by forcing the opposite ends of the rods towards one another they are bowed outwards distending the envelope towards a globular form. The ends of the rods may be pulled towards one another by shortening a lazy-tongs linkage inside the envelope by a cam in actuating mechanism outside the envelope, the fluid pressure on the outside of the envelope being permitted to lengthen the linkage when required to reduce the volume. Alternatively, the forces on the rods may be applied entirely on the outside of the envelope or by an electromagnet inside the envelope either to bow the rods as aforesaid or to straighten them if they are curved rods.

5 Claims, 7 Drawing Figures

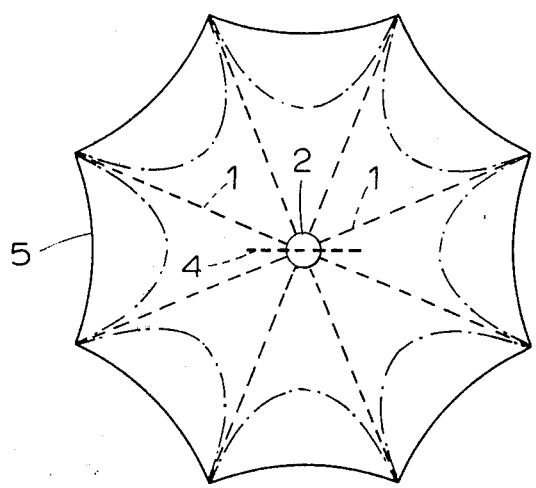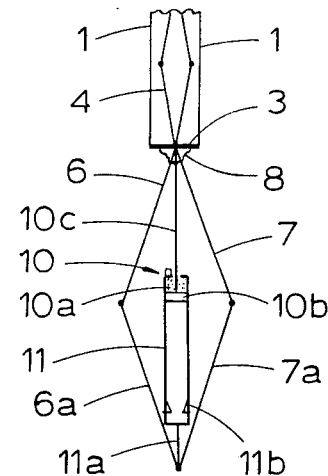
Fig.4　　　　Fig.5
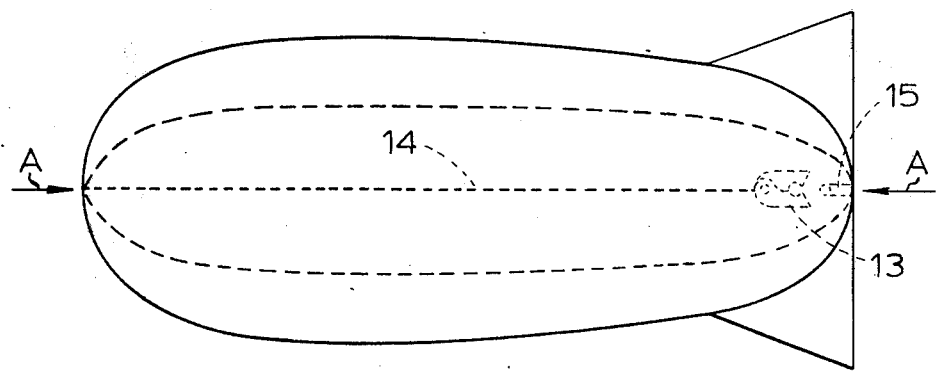
Fig.6

AEROSTATS AND AQUASTATS

FIELD OF THE INVENTION

This invention relates to aerostats and aquastats. An aquastat is analogous to an aerostat in that when submerged in water is capable of supporting weight by its buoyancy.

DESCRIPTION OF THE PRIOR ART

As is well known, balloons and airships usually contain helium or hydrogen, although hot air balloons have recently become popular as sporting vehicles. Coal gas is no longer used. All these balloons, however, have to rely on the availability of the appropriate gas or, in the case of hot air balloons, of the fuel required to heat the air and to keep the air hot. Moreover, helium is expensive and hydrogen is highly inflammable. There is however, a fifth possiblity namely the vacuum balloon, first suggested by Franceso de Lana in the year 1670. Moreover, in an early U.S. Pat. No. 205,319 to James Tracy a vacuum balloon is described having a flexible envelope from which air is pumped to provide a vacuum and which covers a frame of ribs each consisting of a pair of hinged arcuate rods, and each rib being hinged at the top of the balloon to the top of a shaft that extends downwards through the balloon and through a sleeve at the bottom of the balloon. The lower ends of the ribs are hinged to the sleeve. The buoyancy of the balloon is to be controlled by using a screw jack to thrust the shaft to a greater or less extent through the sleeve to vary the volume of the balloon. Obviously it must be difficult to maintain a proper air seal between the shaft and sleeve, the mechanism must be heavy and extend a very considerable distance beneath the balloon if the volume variation is to be substantial.

In addition to the avoidance of a special gas or heating fuel for maintaining its buoyancy, a vacuum ballon is substantially unaffected by super-heating. As it well known, super-heating can be very troublesome, particularly in the case of large airships. Super-heating is caused by flight in sunshine and results in false lift due to the expansion of the gas. This has to be counteracted by valving the gas so that the ship becomes heavy on cooling again, for example in cloud. This heaviness then has to be met by discharging ballast, so that the net result of the super-heating is to reduce the range of the ship.

SUMMARY OF THE INVENTION

An object of the present invention is to provide an aerostat or aquastat in which a vacuum or substantially reduced pressure is set up simply by causing the envelope of the aerostat or aquastat to expand, the envelope being sealed against the entry of external air or water.

A further object of the invention is to provide a balloon adapted to be carried in a folded condition by a rocket to a high altitude at which the balloon is automatically and mechanically expanded into a vacuum ballon equipped for meterological or other scientific or observation purposes.

According to the invention, an aerostat or aquastat includes a sealed envelope of flexible material sealed to provide a barrier to the penetration of any fluid or solid element thereinto, a frame on which said envelope is mounted and capable of being caused to distend the envelope from a condition in which it encloses a comparatively small volume to a condition in which it encloses a comparatively large volume, said envelope containing substantially no gas or such a quantity of has that when the envelope encloses the said large volume, the gas is at a pressure reduced as a result of the distention of the envelope by the frame and sufficiently low to render the aerostat or aquastat buoyant in relation to the ambient air or water pressure, when in use. By controlling the frame to adjust the volume of the envelope, the lift or buoyancy of the device can be controlled in flight or precisely determined before ascent.

Very conveniently, the frame may comprise a number of parallel resilient rods that initially lie parallel to one another, the rods being connected together at each end, and the sealed envelope either contains the rods or the rods are arranged around the envelope and secured along their lengths to the external surface of the envelope. With this arrangement, pressure applied at opposite ends of the rods causes them to bow outwards, thereby increasing the volume of the envelope. This expansion may be effected in various alternative ways. For example, the rods may be arranged round a lazy-tongs linkage connected between the ends of the rods, inside the envelope. Leverage applied to the lazy-tongs at one end causes it to contract in the longitudinal direction, thereby making the rods bow outwards. An alternative would be to arrange the rods round a thin piston and cylinder assembly that is caused to contract by the admission of fluid pressure to the cylinder and so causes the rods to bow outwards. The use of a piston and cylinder assembly can, however, lead to sealing difficulties, and is liable to be heavy and involves an unwieldy extension of the mechanism below the balloon. As a further alternative, the device may be caused to distend by the application of external pressure to opposite ends of the rods. In this case, a simple internal axial latching device may be provided to tie the junction between the rods at one end to the similar junction at the other end when the device has been fully distended. However, where a number of such devices constitute the ballonnets in a rigid airship the shape of the devices may be maintained by external mechanical pressure that is controlled to adjust the lift of the ship.

DESCRIPTION OF THE DRAWINGS

In order that the invention may be clearly understood and readily carried into effect, aerostats and an aquastat in accordance therewith will now be described, by way of example, with reference to the accompanying diagrammatic drawings, in which:

FIG. 4 is a plan of a vacuum aquastat;

FIG. 5 shows a detail of the aquastat of FIG. 4;

FIG. 6 is a side elevation of a vacuum kite balloon, when nearly completely distended.

Figure 1:
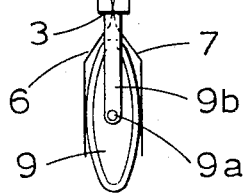
FIG. 1 is a side elevation of a mechanism for distending a vacuum balloon, the mechanism being shown in a collapsed, inactive condition.
Figure 2:
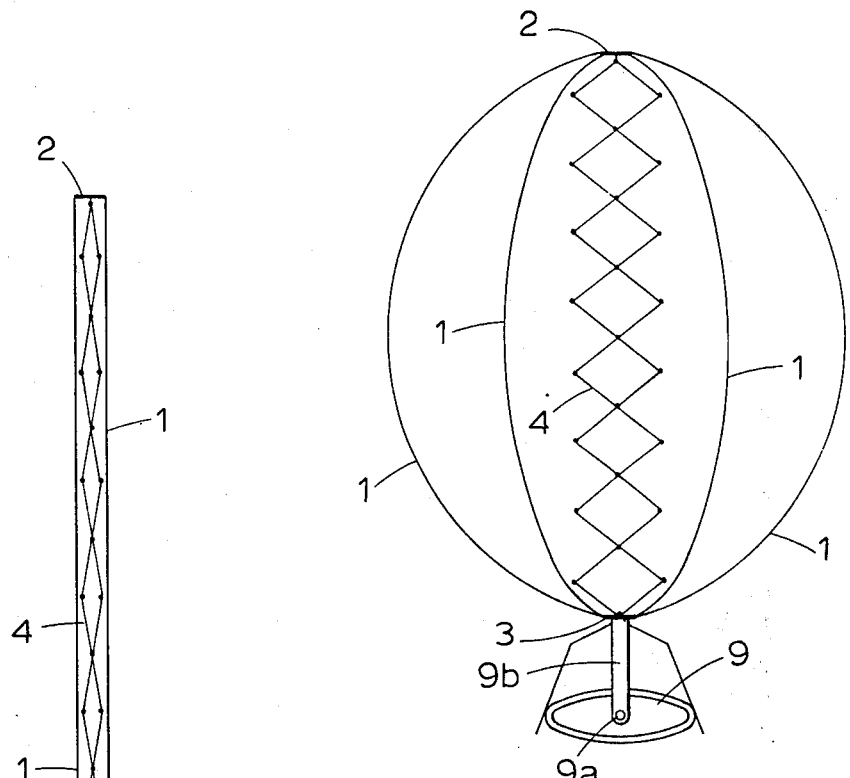
FIG. 2 is a side elevation of the mechanism of FIG. 1 in a distended, active condition.
Figure 3:
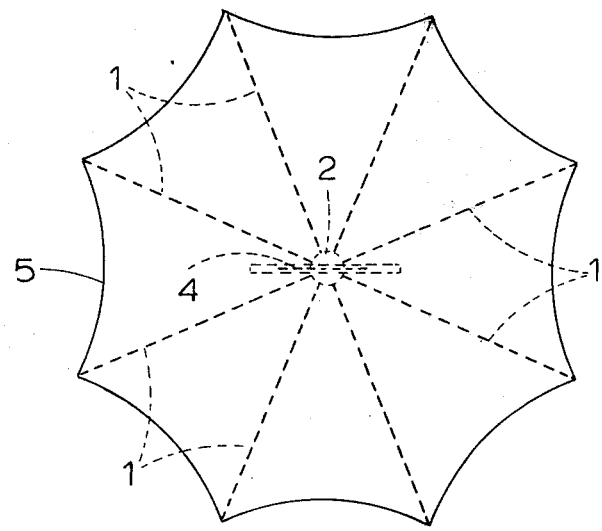
FIG. 3 is a plan of a balloon containing mechanism as shown in FIG. 2.

The vacuum balloon shown in FIGS. 1 to 3 comprises eight resilient rods 1 extending between small plates 2, 3 to which the rods are secured as by hinges or by being located in sockets. The rods are equidistantly distributed round a lazy-tongs linkage 4. This assembly comprising the rods 1, plates 2, 3 and linkage 4, is sealed within a flexible, evacuated envelope 5 (shown only in FIG. 3), which may be made of a synthetic plastics material reinforced by a light-weight woven fabric; for example, a three yarn set fabric of the kind described in British Patent No. 1,157,526 woven from single ply nylon and coated with a preferably non-elastomeric, synthetic plastic that will render the material impermeable to air. This composite material must be flexible but should so far as possible be non-stretchable in its own plane.

The two upper links of the lazy-tongs linkage are hinged to the plate 2 and the two lower links are hinged to the plate 3, but are extended through this plate by arms 6, 7. A flexible seal 8 (such as is shown in FIG. 5, described below) is secured to the plate 2 and to the arms 6, 7 by adhesive to prevent leakage at this location. In the arangement of FIGS. 1 to 3, the arms 6, 7 are engaged by a rotary cam 9. Thus, by turning the cam 9, either by hand or by motor, the arms 6, 7 may be forced apart from the position of FIG. 1 to that of FIG. 2, causing the linkage 4 to contract longitudinally and the rods 1 to bow outwards as shown in FIGS. 2 and 3. To ensure that the rods bow outwards, and not inwards, it may be desirable to prestress them so that they have a slight initial bias. The cam 9 is a comparatively thin unit with a rim and mounted to rotate about an axis 9a on a fork 9b extending downwards from the plate 3. An aeronaut can adjust the lift of the balloon during flight by turning the cam 9 thereby altering the displacement of the ambient air by the evacuated envelope. In FIGS. 2 and 3 the mechanism is set so as fully to distend the envelope. When the cam 9 is turned from this position towards the position of FIG. 1, the external air pressure on the envelope causes the mechanism to return towards the collapsed condition to the extent permitted by the cam.

In the event of leakage the aeronaut would fully expand the envelope to provide a parachute effect.

If the envelope 5 is completely impervious to air and is completely evacuated before being distended, a very hard vacuum will be set up inside the envelope. Excessive stresses may then be set up in the envelope at sea level. This disadvantage can be avoided by either of the three following methods:

a. A certain amount of air can be admitted to the envelope before it is sealed and expanded, thereby reducing the differential pressure between the inside and outside of the envelope when it is fully expanded. This, however, will reduce the buoyancy of the balloon, because of the weight of the air in the balloon.

b. Helium or hydrogen can be admitted to the envelope as it is expanded from zero or nearly zero volume, to a pressure that is sub-atmospheric but sufficient materially to relieve the differential pressure on the material of the envelope and the stresses in the frame. In this case also the buoyancy of the aerostat can be controlled simply by turning the cam 9 to alter the shape of the envelope without the necessity for valving gas. However, the volume cannot, of course, be reduced below that corresponding to atmospheric pressure, that is the pressure surrounding the balloon.

To admit the helium or hydrogen, a flexible tube leading to a source of the gas at atmospheric pressure is sealed to the envelope so that the gas is drawn into the envelope while the envelope is being expanded from zero, or substantially zero, volume, to a volume less than the miximum volume. Thereupon the supply of gas is stopped by a valve. The envelope can then be expanded to its maximum volume while the pressure of the gas inside falls correspondingly. To free the envelope from the tube, the passage through the tube is sealed close to the envelope and the tube is then severed just outside the seal and the portion detached from the balloon taken away. In the case of a thermoplastic tube the sealing may be effected by the application of heat and pressure.

c. The balloon, with the envelope in a collapsed state, with substantially no internal gas, may be carried up by a rocket to a high altitude at which the atmospheric pressure is insufficient to burst the balloon when fully distended. At this altitude the balloon is released and automatically distended by the mechansim of FIGS. 1 to 3 or by mechanism as described below with reference to FIG. 5. It is thought that such a balloon may also be of use when delivered by artificial satellite into the atmosphere of an extra-terrestial planet having a suitable atmosphere, for example high in the atmosphere of Venus.

Two uses are envisaged for the vacuum balloon when used at high altitudes in the Earth's atmosphere. The first is as a replacement for the parachutes that are regularly sent up by rockets to altitudes at which they are released carrying radiosonde equipment that transmits meteorological information while the parachute drifts downwards. It is thought that the balloon would provide considerably longer transmission periods. The second use is to provide a carrier for scientific equipment in the altitude range between about 50 to 100 miles, in which the atmosphere is too thin to provide support for normal balloons and aircraft, but too dense to enable a satellite to remain in orbit for a prolonged period. Obviously a balloon for use at these high altitudes must be extremely lightly constructed. For example, synthetic resin bonded carbon fibre may be used for the lazy-tongs and rods and the envelope made of Mylar or very light proofed woven nylon.

The aquastat of FIGS. 4 and 5 is similar to the aerostat of FIGS. 1 to 3 except that the envelope 5 is made of resilient material and the means for shortening the lazy-tongs linkage 4 are as shown in FIG. 5. The aquastat carrying a load such as a sonar or underwater camera is dropped into the water when in the condition of FIG. 1. On reaching a predetermined depth, a pressure responsive device 10 (FIG. 5) causes an explosive charge 10a to fire so as to cause the mutual approach of a piston 10b, connected by a rod 10c to the plate 3, and the remote end of a cylinder 11 connected by a rod 11a to an articulated joint between two links 6a, 7a pivoted at their upper ends to the arms 6, 7 constituting continuations rigid with the lowermost links of the lazy-tongs 4. Thus, the linkage 6, 7, 6a, 7a is caused to contract along the axis of the piston and cylinder and at the end of this movement the piston 10b is held by latches 11b at the lower end of the cylinder 11. The sudden ignition of the explosive charge will cause a rapid expansion of the frame. As this might cause the envelope 5 to rupture, the envelope is made of resilient water-tight sheeting so that it will first take the shape shown in chain lines in FIG. 4 and then settle to the configuration shown in full lines.

As already indicated, the mechanism of FIG. 5 may be applied also as a modification to the balloon in FIGS. 1 to 3. In this case the explosive charge 10a is fired automatically, for example, when the balloon is released from a rocket. Alternatively in the case of a manned balloon, the relative positions of the piston 10b and the cylinder 11 may be controlled by fluid pressure admitted under the control of the aeronaut through a flexible pipe leading from the gondola.

It is of interest to note that the rods 1 should not be forced by the lazy-tongs beyond the semi-circular form into a semi-elliptical form with the major axis perpendicular to the lazy-tongs axis, because the external pressure on the envelope would then tend to cause the lazy-tongs to collapse towards its fully contracted condition. In fact the force necessary to expand the balloon decreases towards the circular condition of the rods, whereupon the reaction reverses.

In the kite balloon of FIG. 6, the lazy-tongs linkage is omitted and the frame (when the balloon is on the ground) is expanded by external pressure applied by manpower or by mechanical means at opposite ends as shown by the arrows A. For example, the frame may be placed a little way above the ground against an abutment such as a wall at one end and at the other end engaged by a motor vehicle moving slowly in reverse. Alternatively, the frame may be stood on end with detachable guy ropes radiating from its top end to be pulled downwards by manpower to expand the frame. When the frame is fully expanded, a latching device comprising a double-hook clip 13 carried by an axial rod 14 snaps onto a ring 15 (shown in side view) at the other end of the frame, so as to hold the balloon in the distended condition. The double-hook clip has two prongs flared apart towards their tips from a point at which they are initially substantially in contact. As the clip approaches the ring they are forced apart and then snap into the ring which then extends through a circular gap behind the point at which the prongs are substantially in contact. Of course, this form of balloon is in some measure an expendable balloon to be used only in an emergency as the clip cannot readily be undone again. The shape of the balloon is determined by the shape of the envelope.

Figure 7:
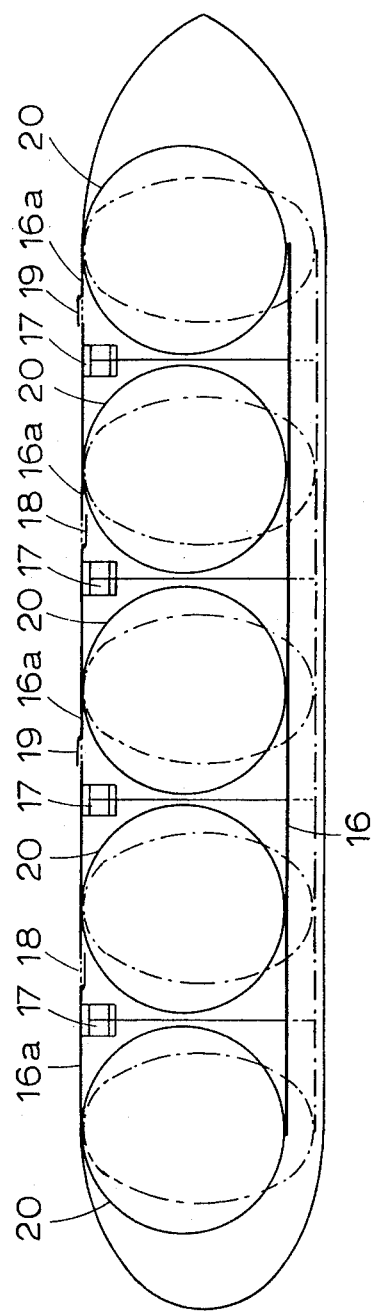
FIG. 7 is a sectional side elevation of an airship.

FIG. 7 shows very diagrammatically a rigid airship having a main body structure of ordinary form, i.e., a frame work substantially enclosed by sheet material and in the form of a tube closed by converging portions at each end. The main body structure contains five ballonnets 20, each containing the rods 1 but no other mechansim. They may be filled with helium or hydrogen at reduced pressure as described above. The ballonnets are maintained in the distended condition by being pressed between a longeron 16a at the top of the ship and a beam 16 supported by piston and cylinder devices 17 interposed between the beam 16 and the longeron 16a. The separation between the beam 16 and the longeron 16a is adjustable by the admission and release of pressure fluid to the devices 17. By adjusting the height of the beam 16 with respect to the longeron 16a, the shape of the ballonnets can be varied between the shape of maximum buoyancy shown in full lines and the less buoyant shape shown by chain lines, wherein the evacuated volume displaces less ambient air. To adjust the trim of the ship, the beam 16 may be tilted by the application of selectively differentiated pressure to the devices 17 with respect to the longitudinal axis of the ship. Of course, this adjustment alters the volume of air at atmospheric pressure within the ship, between its outer covering and the envelopes 5, so that air is drawn through automatic valves 18 at the surface of the ship when the volume of the ballonnets is reduced, and expelled through automatic valves 19 when the volume of the ballonnets is increased. In this arrangement the action of the rods 1 may be reversed. Thus the rods 1 may be set so that they normally take the shape of semicircles and the devices 17 are arranged to pull down by the beam 16 to reduce the curvature of the rods, so reducing the volume of the ballonnets. In this case, the assembly of each ballonnet must be effected by straightening the rods, enclosing them in the envelope, sealing the envelope while containing substantially no volume and then allowing the rods to spring back to their curved condition. In place of the devices 17 and beam 16, each ballonnet may contain an electromagnet and magnetizable rod assembly connecting the top and bottom of the frame so that the curvature of the rods can be controlled according to the supply of electric current to the solenoid from outside the ballonnet through conductors sealed to the envelope.

If the ballonnets (assuming that they contain air at greatly reduced pressure) are such that slight leakage occurs through the envelopes, these may be maintained in the evacuated condition by suction provided by one or more propulsive units also used to propel the airship. A form of propulsive unit suitable for evacuating the ballonnets is a gas turbine jet engine of the turbofan or by-pass type provided with a propulsion nozzle of the ejector type having an ejector ring encircling the propulsion nozzle and connected to produce a valve controlled suction effect in one or more of the ballonnets, this suction effect being due to the depression in the ejector ring due to the propulsion jet.

While the invention has been described above with reference to preferred embodiments, it should be understood that it is not intended to limit the invention to those embodiments, but to cover all alternatives, modifications and equivalents as may be included within the spirit and scope of the invention as defined by the appended claims.

I claim:

1. A rigid airship comprising an elongated tubular framework, sheet material covering and substantially enclosing said framework, said framework and sheet material providing a tubular structure closed by converging portions at each end, a plurality of ballonnets distributed along the interior of said framework, to render said airship buoyant, each said ballonnet being a sealed globular unit having a deformable wall structure enabling the form of the ballonnet to be changed to vary the volume thereof, and each said ballonnet being evacuated of internal gas to reduce the internal pressure and weight of gas therein substantially below the pressure and weight of an equivalent volume of air external to the airship, means controlled externally to the ballonnets for differentially varying the shapes and therefore the volumes of said ballonets to control the buoyancy and trim of the airship and valve means permitting air to enter and leave the interior of said convering according to variations in the shapes and volumes of said ballonnets.

2. A device for providing buoyancy in a fluid when submerged in the fluid, said device comprising a sealed envelope of flexible material impervious to the passage of gas therethrough, said envelope being evacuated so as to contain at most gas at a predetermined pressure substantially lower than that of the fluid in which the device is buoyant, a frame comprising a plurality of resilient elongated rods each extending along a portion of the envelope, first means connecting said rods together at first ends thereof, second means connecting said rods together at second ends thereof, a lazy-tongs linkage comprising a series of pairs of rigid links, the links in each pair being pivoted together at their centres and the ends of each link in each such pair being pivoted to links respectively in adjacent pairs in said series, a first pair of further links pivoted to said first connecting means and respectively connected to the ends of the links at one end of said series, and a second pair of further links pivoted to said second connecting means and respectively connected to the ends of the links at the other end of said series, diverging extensions on said second pair of further links projecting outside said envelope and controlled mechanical means operative on said extensions to adjust the divergence thereof and consequently the length of said lazy-tongs linkage, whereby opposed forces respectively acting on said first and second means produce simultaneous changes in the curvature of said rods, said rods being operative on said envelope when increasing their curvature to distend said envelope from a condition in which it encloses a comparatively small volume to a condition in which it encloses a comparatively large volume thereby increasing the buoyancy of the device in relation to the fluid.

3. A device for providing buoyancy in a fluid when submerged in the fluid, said device comprising a sealed envelope of flexible material impervious to the passage of gas therethrough, said envelope being evacuated so as to contain at most gas at a predetermined pressure substantially lower than that of the fluid in which the device is buoyant, a frame comprising a plurality of resilient elongated rods each extending along a portion of the envelope, first means connecting said rods together at first ends thereof, second means connecting said rods together at second ends thereof, whereby opposed forces respectively acting on said first and second means product simultaneous changes in the curvature of said rods, said rods being operative on said envelope when increasing their curvature to distend said envelope from a condition in which it encloses a comparatively small volume to a condition in which it encloses a comparatively large volume thereby increasing the buoyancy of the device in relation to the fluid, and a latching device within said envelope and having two interlatching elements respectively mounted on said first and second connecting means and located to interengage and hold said envelope in said condition enclosing said larger volume when the curvature of said rods produces said larger volume.

4. A device for providing buoyancy in a fluid when submerged in the fluid, said device comprising an envelope of flexible material impervious to the passage of gas therethrough, said envelope being sealed to provide a barrier to the penetration of any fluid or solid element thereinto and said envelope being evacuated so as to contain at most a predetermined pressure substantially lower than that of the fluid in which the device is buoyant, a frame comprising a plurality of rods distributed round said envelope and each rod being a continuous resilient member able to be bent between a substantially straight shape and a pronounced arcuate shape, said frame also comprising first means connecting said rods together at first ends of said rods and second means connecting said rods together at second ends thereof, whereby opposed forces respectively acting on said first and second means simultaneously stress said rods in producing equal changes in the curvature thereof, and said rods being operative in said envelope as a result of changing curvature of said rods to distend said envelope from a condition in which it encloses a comparatively small volume to a condition in which it encloses a comparatively large volume thereby increasing the buoyancy of the device in relation to the fluid, and mechanism carried by the device operable on said first and second means for holding said rods in a predetermined curved condition, said mechanism carried by the device comprising an actuator unit for selectively exerting opposed forces along an axis wholly and permanently external to said envelope, two actuator members mounted outside said envelope for movement to and fro in opposed directions and coupled to said actuator unit such that the opposed movements in one said direction are solely under the action of ambient fluid pressure on said envelope and the opposed movements in the other said direction are solely under the action of said opposed forces exerted by said actuator unit, and linkage elements connecting said two actuator members respectively to said first and second means for forcing said first and second means toward one another to increase the volume of said envelope in response to said opposed movements in said other direction and permitting said fluid pressure to return said envelope toward said zero volume and said rods toward said straight shape as said actuator members undergo opposed movements in said one direction.

5. A device for providing buoyancy in a fluid when submerged in the fluid, said device comprising an envelope of flexible material impervious to the passage of gas therethrough, said envelope being sealed to provide a barrier to the penetration of any fluids or solid element thereinto and said envelope being evacuated so as to contain at most a predetermined pressure substantially lower than that of the fluid in which the device is buoyant, a frame comprising a plurality of rods distributed round said envelope and each rod being a continuous resilient member able to be bent between a substantially straight shape and a pronounced arcuate shape, said frame also comprising first means connecting said rods together at first ends of said rods and second means connecting said rods together at second ends thereof, whereby opposed forces respectively acting on said first and second means simultaneously stress said rods in producing equal changes in the curvature thereof, and said rods being operative in said envelope as a result of changing curvature of said rods to distend said envelope from a condition in which it encloses a comparatively small volume to a condition in which it encloses a comparatively large volume thereby increasing the buoyancy of the device in relation to the fluid, and mechanism carried by the device operable on said first and second means for holding said rods in a predetermined curved condition, said rods being arranged to be bent from said substantially straight shape to a substantially semi-circular shape, said mechanism carried by the device being operatively connected to said first and second means for forcing said first and second means toward one another to increase the volume of said envelope from zero and for selectively releasing the force on said first and second means to permit said first and second means to move selectively away from one another to permit ambient fluid pressure to return said envelope toward said zero volume and said rods toward said straight shape, and a quantity of lighter-than-air gas permanently sealed in said envelope when said device is buoyant and at a pressure equal to the atmospheric pressure outside said envelope when the curvature of said rods is comparatively small and a pressure substantially below said atmospheric pressure when the curvature of said rods is substantially increased to form said comparatively large volume in said envelope.

* * * * *